Patented Feb. 18, 1941

2,232,662

UNITED STATES PATENT OFFICE 2,232,662

NICOTINE DERIVATIVE AND USES THEREFOR

George L. Hockenyos, Springfield, Ill., assignor to Monsanto Chemical Company, St. Louis, Mo., a corporation of Delaware No Drawing. Application March 5, 1938, Serial No. 194,083

13 Claims. (Cl. 260—291)

The present invention relates to new chemical compounds adapted for use as insecticidal materials. More particularly this invention relates to new materials exhibiting insecticidal properties containing a nicotine alkaloid as an active constituent thereof.

The use of nicotine and nicotine sulfate in insecticidal compositions is well-known. However, such use has many defects and disadvantages. Thus, nicotine, which is a contact and stomach poison, is relatively volatile and comparatively shortly after application to the insect infested area has completely evaporated or the concentration thereof has so diminished that it is no longer effective. The use of nicotine sulfate in some respects is an improvement over the use of nicotine itself. Thus, the extreme volatility of the insecticide has been obviated. Yet, however, due to its water-solubility and inefficient spreading and penetrating properties, its use is objectionable for many purposes, and especially when employed in outdoor application.

One of the objects of this invention is to provide a compound embodying a nicotine alkaloid, which compound is relatively stable and from which the liberation of the alkaloid by volatilization is very slow.

A further object of this invention is to provide a relatively stable, non-volatile nicotine containing composition possessing improved insecticidal properties.

A further object of this invention is to provide a nicotine alkaloid composition providing improved spreading and penetration into vegetation on which it is applied.

Other and further objects of this invention will be hereinafter shown.

In accordance with the present invention it has been discovered that nicotine alkaloids chemically combined with aromatic sulfonic acids comprises a new and improved efficient class of insecticides. More particularly the invention comprehends nicotine salts of aromatic sulfonic acids and their use in insecticidal compositions. The new class of insecticides are not readily volatile on exposure to the air and furthermore due to their inherent properties are not readily washed from the sprayed or otherwise contacted vegetation.

Included within the scope of the preferred materials are the nicotine and its related salts of benzene, toluene, naphthalene, diphenyl, chlor diphenyl, ortho and para phenyl phenol, chlorphenol, phenol and cresol sulfonic acids, preferably containing one or more nuclear substituted alkyl groups, although such substitution is not necessary. As typical alkyl substituents are ethyl, propyl, butyl, amyl, hexyl, heptyl, octyl, nonyl, decyl, undecyl, dodecyl, tridecyl, tetradecyl, pentadecyl and hexadecyl radicals. If desired alkyl substituents having a larger number of carbon atoms may be employed. It has been discovered according to the present invention, however, that nicotine salts of aromatic sulfonic acids having alkyl substituents comprising at least ten carbon atoms function the most efficiently as insecticidal compositions.

In the preparation of the alkylated aromatic sulfonates, with which the nicotine compound is combined, any suitable method may be employed. Thus, the alkyl halide may be prepared by halogenating a suitable paraffin and the halide condensed with the aromatic compound by the Friedel-Crafts reaction embodying the use of aluminum chloride as a catalyst. The alkylated aromatic compound is then sulfonated by the use of a suitable and desirable sulfonating agent, as for example sulfuric acid, oleum and chlor-sulfonic acid. Again, in the alkylation of the aromatic substances, olefines may be employed as the alkylating agent. In the sulfonating and alkylating of the phenols, as for example the phenyl phenols, the process as disclosed in United States Patent No. 1,921,546, granted to Robert L. Sibley, may be employed. If desirable more than one alkyl group and more than one sulfonic acid group may be substituted on the aromatic nucleus. Thus, the polyalkylated monosulfonates and monoalkylated polysulfonates may be reacted with nicotine alkaloids and employed effectively as insecticides.

The compounds of this invention are readily and conveniently prepared by reacting nicotine as a free base in water solution with the desired aromatic sulfonic acid.

As a specific example of the preparation of the new and preferred class of compounds, tridecane was halogenated by the introduction of chlorine therein so as preferably to produce the monochloride. The tridecyl chloride so produced was condensed with benzene employing the well-known Friedel-Crafts reaction involving the use of aluminum chloride as a catalyst, after which the tridecyl benzene so obtained was sulfonated by means of 98% sulfuric acid, and the free tridecyl benzene sulfonic acid in water solution treated with nicotine base until the resultant product had a pH of 7. The resultant product after suitable dilution is sprayed or otherwise contacted on the infested vegetation.

As illustrative of the invention, solutions and suspensions of various nicotine alkylated aryl sulfonates were made in a suitable medium and the toxicity thereof determined against the black chrysanthemum aphid. Various concentrations of the alkylated arylated nicotine sulfonates were employed and compared to nicotine sulfate. The results of the tests are given in the following table. It is to be noted that the amounts of nicotine specified are the quantities of nicotine actually present in the materials used. There is thus an accurate and true comparison between the compounds of the invention and nicotine sulfate.

Table I

| Compound | Concentration of nicotine, grams per 100 cc. | Percent mortality (average of five replicate tests) |
|---|---|---|
| Nicotine tridecyl benzene sulfonate | .00097 | 8 |
| Do | .0031 | 17 |
| Do | .0042 | 35 |
| Do | .0049 | 70 |
| Do | .0081 | 80 |
| Do | .0093 | 87 |
| Do | .0137 | 92 |
| Do | .0177 | 98 |
| Do | .023 | 98 |
| Nicotine dodecyl benzene sulfonate | .00237 | 13 |
| Do | .0025 | 14 |
| Do | .00257 | 19 |
| Do | .00606 | 35 |
| Do | .0072 | 51 |
| Do | .011 | 68 |
| Do | .0129 | 66 |
| Do | .0197 | 87 |
| Do | .0292 | 93 |
| Nicotine decyl benzene sulfonate | .0026 | 12 |
| Do | .0035 | 17 |
| Do | .005 | 16 |
| Do | .0073 | 20 |
| Do | .0107 | 25 |
| Do | .015 | 71 |
| Do | .0197 | 74 |
| Do | .0296 | 88 |
| Nicotine amyl benzene sulfonate | .003 | 12 |
| Do | .0052 | 11 |
| Do | .0065 | 18 |
| Do | .0076 | 24 |
| Do | .011 | 27 |
| Do | .0143 | 49 |
| Do | .021 | 82 |
| Do | .0287 | 86 |
| Nicotine heptyl benzene sulfonate | .0058 | 12 |
| Do | .007 | 14 |
| Do | .0091 | 29 |
| Do | .0114 | 27 |
| Do | .0128 | 30 |
| Do | .0157 | 60 |
| Do | .0231 | 86 |
| Nicotine sulfate | .007 | 12 |
| Do | .0112 | 17 |
| Do | .0123 | 16 |
| Do | .0136 | 16 |
| Do | .015 | 28 |
| Do | .0192 | 54 |
| Do | .0224 | 67 |
| Do | .0281 | 82 |
| Do | .0314 | 86 |

An examination of the above data shows the superiority of the preferred materials over nicotine sulfate.

Tests carried out on the aphids infesting egg plant likewise showed the superiority of the compounds of the present invention over nicotine.

As a further specific embodiment of this invention, substantially 0.025 gram mols each of the free sulfonic acid of butylated and sulfonated phenyl phenol, prepared as disclosed in the above mentioned United States Patent No. 1,921,546, and nicotine as the free base, were introduced into a suitable reaction vessel containing about 200 c. c. of water at room temperature. Cloudiness developed immediately and this increased on standing. As the reaction proceeded, a waxy material formed. On the completion of the reaction, the precipitated product was separated from the solution.

The waxy product so obtained is relatively stable upon exposure to the atmosphere, but does, however, hydrolyze slowly to liberate nicotine which volatilizes. This slow hydrolysis is believed desirable and necessary to render the material most effective as a toxic to insect life. However, the rate is so gradual that the nicotine remains effective over a much longer period of time than the free base. Leaching and dissolving away of the product by water was also greatly retarded or prevented by reason of the inherent properties of the insecticide.

As a convenient method of applying the above described nicotine salt of the butylated and sulfonated phenyl phenol to plants, it may be dissolved in alcohol, acetone or similar organic solvent to form concentrated solutions. These may contain as much as 50% of the nicotine salt of alkylated and sulfonated phenyl phenol dissolved therein, but solutions of lower concentrations, as for example 25% to 30%, are usually employed. The solution so obtained is diluted with water until the desired ratio of insecticide is obtained.

A desirable concentration is produced by adding water thereto until a ratio of about one part of the nicotine salt to two to four hundred parts of water is reached. Even at these high dilutions the nicotine-butylated and sulfonated phenyl phenol derivative does not separate or decompose. The solvents in such solutions upon distribution, as for example by spraying, soon evaporate leaving the nicotine containing product as a uniform film upon the surfaces of the vegetation which are infested or which are to be protected from infestation. These films retain their original soft, waxy character and are readily ingested by chewing insects, and have been found to be efficient insecticidal compositions.

As a further specific embodiment of this invention the nicotine salt of the amylated and sulfonated phenyl phenol has been prepared and employed as an insecticide in the same manner as disclosed above for the nicotine derivative of the butylated and sulfonated phenyl phenol, and found to possess the insecticidal characteristics typified by the class.

If desired a satisfactory spray may be made by dissolving one part of the nicotine salt of the amylated or butylated phenyl phenol sulfonic acid, along with two or more parts of the alkali salt of amylated or butylated phenyl phenol sulfonic acid in as much acetone as is required to make a clear solution, and then diluting this solution with about 200 parts of water.

It is to be understood that the above embodiments are not in any sense limitative of the scope of the invention but are illustrative only. Numerous modifications may be made therein as will be apparent to those skilled in the art to which the invention pertains. The invention is limited solely by the appended claims.

This application is a continuation in part of my copending application Serial No. 14,821 filed April 5, 1935.

What is claimed is:

1. A nicotine salt of an alkylated aromatic sulfonic acid.

2. A nicotine salt of an alkylated benzene sulfonic acid.

3. A nicotine salt of tridecyl benzene sulfonic acid.

4. A nicotine salt of dodecyl benzene sulfonic acid.

5. A nicotine salt of an alkylated and sulfonated phenol.

6. A nicotine salt of an alkylated and sulfonated phenyl phenol.

7. A nicotine salt of butylated and sulfonated phenyl phenol.

8. An insecticidal composition comprising a nicotine salt of an alkylated aromatic sulfonic acid as an active constituent thereof.

9. An insecticidal composition comprising a nicotine salt of an alkylated benzene sulfonic acid as an active constituent thereof.

10. An insecticidal composition comprising a nicotine salt of tridecyl benzene sulfonic acid as an active constituent thereof.

11. An insecticidal composition comprising a nicotine salt of dodecyl benzene sulfonic acid as an active constituent thereof.

12. An insecticidal composition comprising a nicotine salt of an alkylated and sulfonated phenyl phenol as an active constituent thereof.

13. An insecticidal composition comprising a nicotine salt of butylated and sulfonated phenyl phenol as an active constituent thereof.

GEORGE L. HOCKENYOS.